United States Patent [19]

Dietz

[11] 4,232,357

[45] Nov. 4, 1980

[54] AUTOMOBILE MECHANIC'S AID

[76] Inventor: Markus S. Dietz, 965 Country Acres, Wichita, Kans. 67212

[21] Appl. No.: 4,651

[22] Filed: Jan. 19, 1979

[51] Int. Cl.[3] .............................................. B60Q 1/00

[52] U.S. Cl. ........................................ 362/61; 362/75; 362/191; 362/285; 362/431; 362/430

[58] Field of Search ............... 362/253, 277, 285, 431, 362/191, 61, 430, 75

[56] References Cited

U.S. PATENT DOCUMENTS 4,049,959 9/1977 Ledterman ....................... 362/431 X

*Primary Examiner*—Stephen J. Lechert, Jr.

*Attorney, Agent, or Firm*—Robert E. Breidenthal

[57] ABSTRACT

An automobile mechanic's aid, which is largely collapsible for convenient storage and shipping, which is adjustable to position a tool holding tray at selected heights, and which includes support structure enabling concurrent use of the tray as a tray and as a seat. A work illuminating electric lamp is included which is adjustably positionable and which can be selectively powered from a convenience outlet of an alternating current power main or an automobile storage battery.

14 Claims, 14 Drawing Figures

FIG. 4
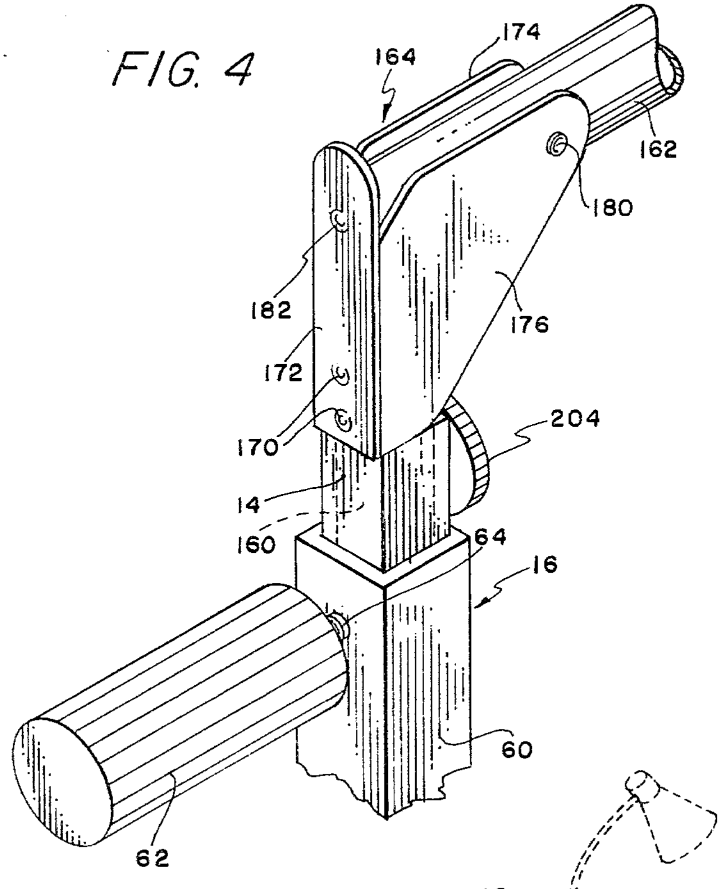
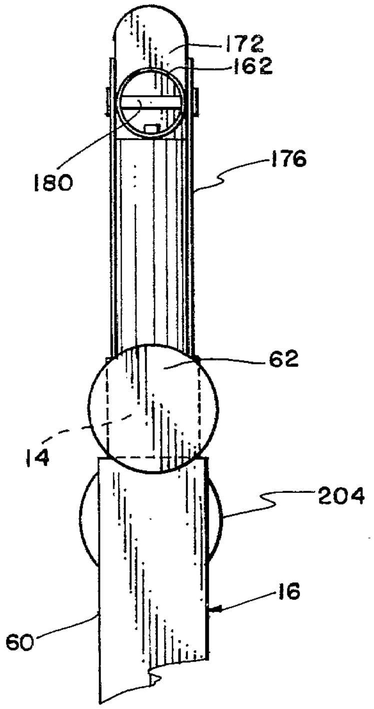
FIG. 5
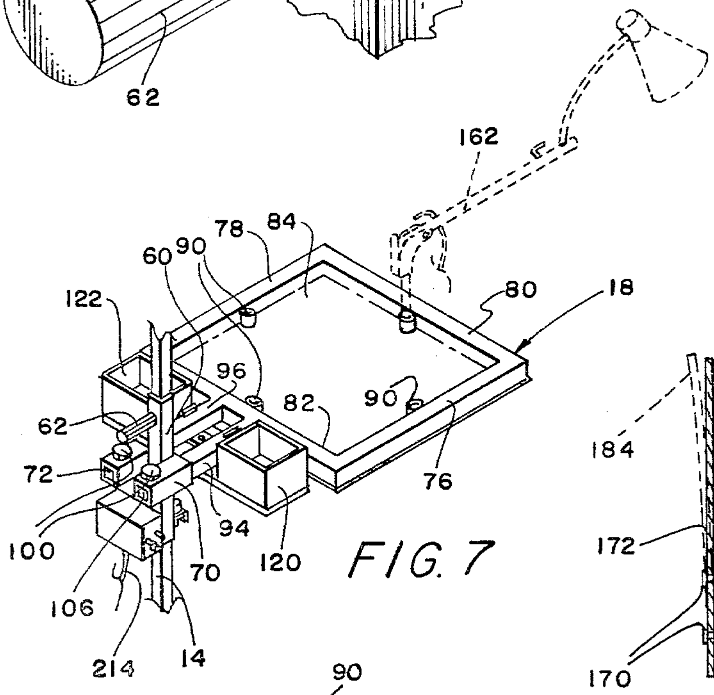
FIG. 7
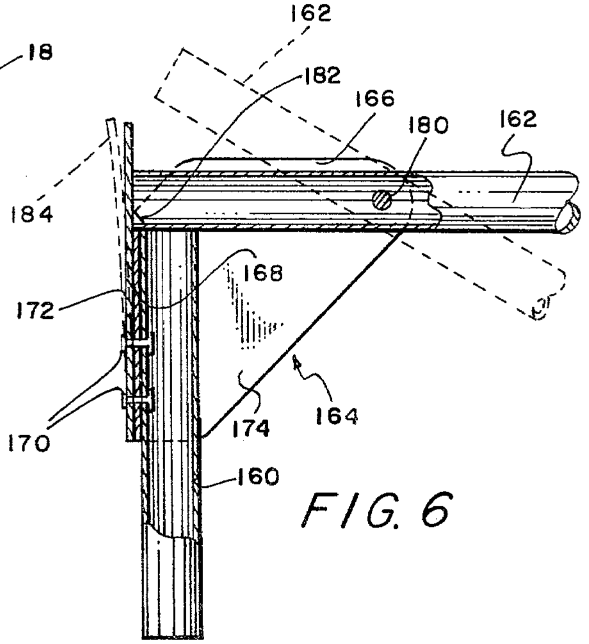
FIG. 6
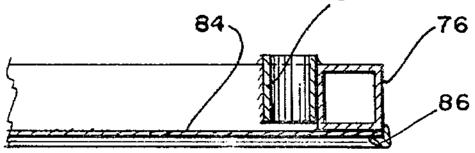
FIG. 8

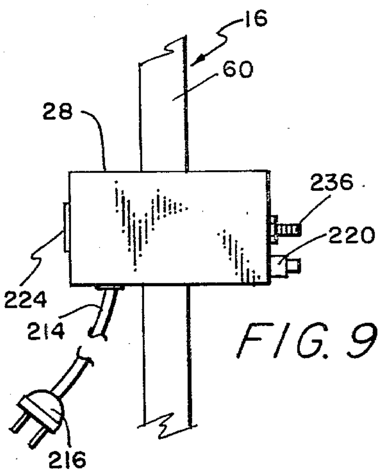
FIG. 9
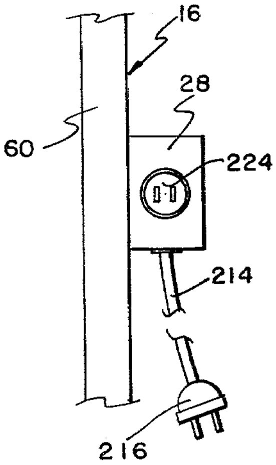
FIG. 10
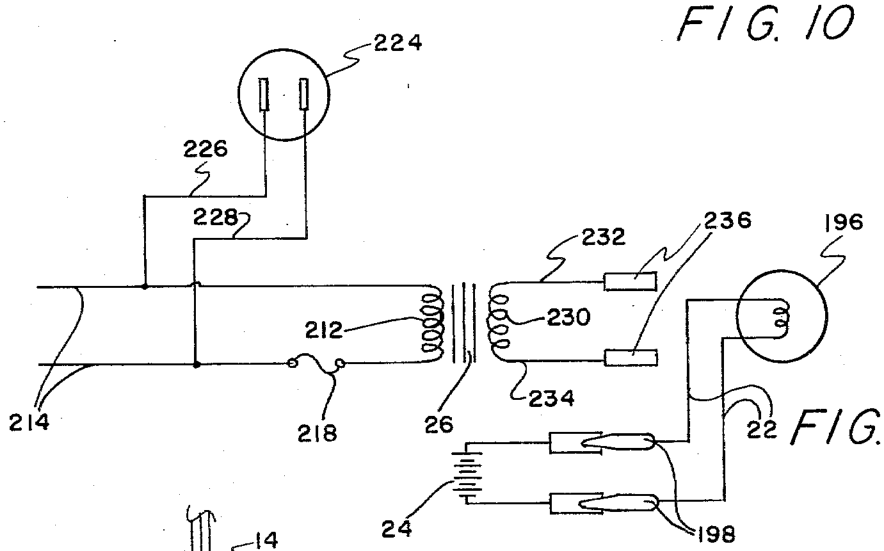
FIG. 11
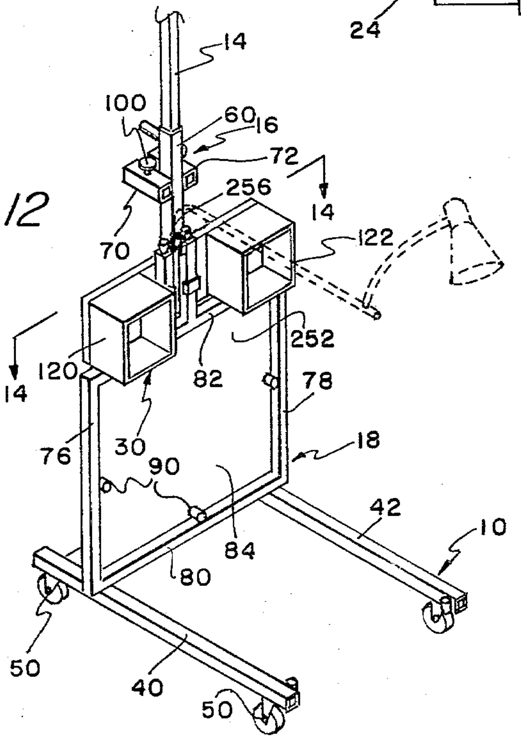
FIG. 12
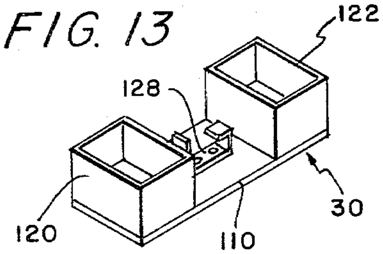
FIG. 13
FIG. 14
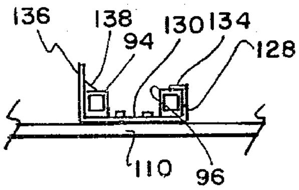

AUTOMOBILE MECHANIC'S AID

The present invention relates to new and useful improvements in apparatus for the convenience of mechanics in making repairs or adjustments on automobile engines and the like, and more particularly pertains to a portable stand carrying a vertically positionable tool tray having concurrent utility as a seat, together with a work illuminating lamp that can be selectively powered from utility power mains or a storage battery.

The paramount object of the instant invention is to provide apparatus such that a mechanic may illuminate the vicinity of his immediate concern and have his tools in readiness for use at a position in close proximity to such vicinity.

An important object is to provide apparatus such as specified above which will, when the vicinity of concern is of low height, additionally provide a seat for a mechanic so that he need not squat or sit on the floor.

Yet another important object is to provide apparatus in accordance with the above objects which can be selectively energized for illumination from utility power mains when convenient; otherwise from an electric storage battery.

Additional objects are to provide apparatus in accordance with the above objects that is readily portable and which can be collapsed into a compact condition for storage, with which apparatus may be economically manufactured and be of a durable character.

A broad aspect of the invention involves an automobile mechanic's aid comprising a wheeled base and an upstanding support column fixed thereto, a mounting bracket slidably mounted on the column for selective vertical positioning therealong, means for releasably retaining the bracket on the column at a selected vertical position, a tray carried by the mounting bracket for vertical movement therewith, an electric lamp means carried by the bracket for vertical movement therewith, and energization means for enabling selective electrical energization of the lamp from alternating current power mains and an electric battery, said energization means also being carried by the bracket for vertical movement therewith, whereby a mechanic can vertically position the bracket to place needed tools and lamp in convenient and illuminating positions relative to a portion of an automobile requiring his attention, with the lamp being energizable from such automobile if necessitated by remoteness from power mains.

These and other objects and features of the invention will become manifest on considering the following description of a preferred embodiment of the invention, such description being given in conjunction with the accompanying drawings illustrative thereof, wherein:

FIG. 1 is an isometric view of the apparatus showing the tray disposed in a lowered position with components disposed so as to constitute a seat for a mechanic. A mechanic is depicted seated upon the apparatus in a position to work upon the brakes of a fragmentary illustration of an automobile, with the brakes being illuminated by a lamp which is powered from the storage battery (shown in dashed outline) of the automobile;

FIG. 4 is an enlarged fragmentary detail view illustrating a joint in the lamp support structure as well as the combined handle and tray position securing screw;

FIG. 5 is a front elevational view of the structure shown in FIG. 4 with hidden details being shown in dashed outline and the horizontal section of the lamp support being shown in section;

FIG. 6 is an enlarged side elevational view of the joint shown in FIGS. 4 and 5, the view being partially in section and showing an alternative position of components in dashed outline;

FIG. 7 is an isometric view of the tray from above and the rear of the same, with only a portion of the support column being shown, this view showing the lamp and its support structure in dashed outline at one of the alternative positions thereof;

FIG. 8 is an enlarged sectional detail view taken upon the plane of the section line 8—8 in FIG. 2;

FIG. 9 is an enlarged fragmentary rear elevational view of the transformer housing and related components with the slide bracket on which it is mounted being only partially shown;

FIG. 10 is a side elevational view of the structure shown in FIG. 9 and illustrates the alternating current jack carried by the transformer housing;

FIG. 11 is a schematic diagram of the electrical system illustrating the alligator clips by means of which the lamp can be selectively connected to the storage battery terminals or the terminals of the transformer secondary;

FIG. 12 is a fragmentary isometric view illustrating the tray and parts bin in collapsed or storage position and serves additionally to show in dashed outline an alternative position that the lamp and its support may occupy relative to the support bracket;

FIG. 13 is an isometric view of the bin structure and illustrates the spring clip by means of which the bin structure can be detachably secured to the tray support arms; and, FIG. 14 is an enlarged sectional detail view taken upon the plane of the section line 14—14 in FIG. 12, and shows the spring clip engaged with the support arms of the tray.

Figure 1:
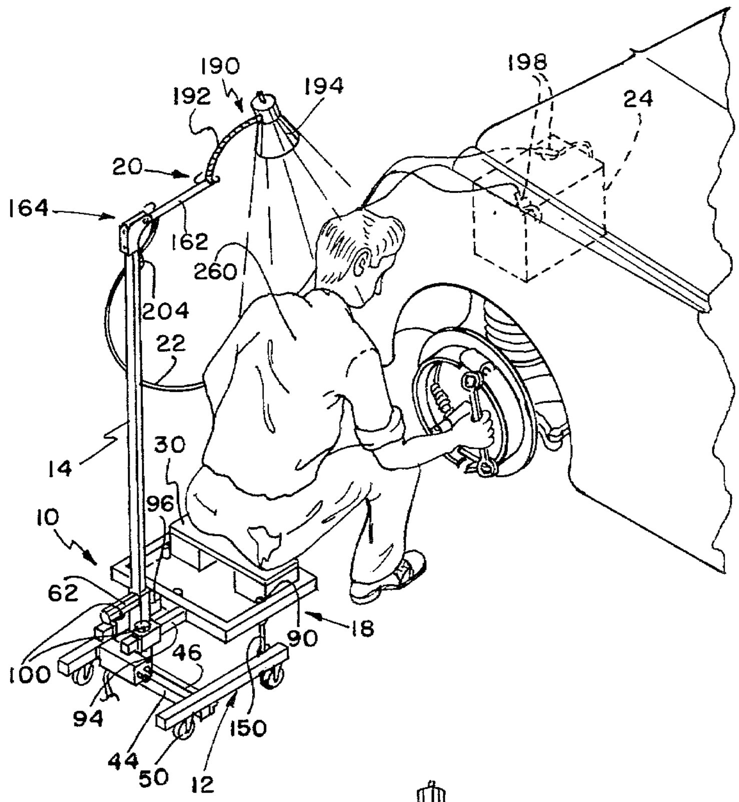

Referring now to the drawings wherein like numerals designate like parts throughout the various views, the reference numeral 10 designates the mechanic's aid generally, the same being comprised of a wheeled base 12, a vertical support column 14 fixed to and upstanding on the base 12, a mounting bracket 16 slidable on and selectively positionable on the column 14, a tray 18 carried by the bracket 16 when the aid 10 is in use, a multipositionable electric lamp structure 20, and means for supplying energy to the latter inclusive of alligator clip equipped leads 22 selectively connectable to a storage battery 24 (as shown in FIG. 1), or to the terminals of the secondary winding of an electric power transformer 26 (see FIG. 11) disposed in a housing 28 mounted on the bracket 16. The aid 10 also includes unit 30 alternatively suited for use as a parts bin or as a seat for a mechanic as shown in FIG. 1.

The base 12 is of a generally U-shape configuration and comprises a pair of spaced parallel side rails 40 and 42 which are joined adjacent their rear ends by a transverse rail 44 welded at its opposite ends thereto. The rails 40, 42 and 44 are preferably tubular steel stock. The structure is further rigidified by an angle 46 spaced forwardly of the rail 44 having its opposite ends also welded to the rails 40 and 42. A socket member 48 of square tubular steel stock and with a constricted lower end is vertically disposed between the rail 44 and the angle 46 and is welded to such elements midway between the rails 40 and 42 with the axis of the socket member 48 being vertical.

Each of the rails 40 and 42 is provided with caster wheels 50 adjacent its forward and rear extremities, whereby mobility in any direction upon any planar supporting surface is obtained.

U-shaped configuration of the base 12 enables the aid 10 to be positioned closely adjacent work requiring the mechanic's attention by reason of the fact that the rails 40 and 42 can straddle what would otherwise be an obstruction and such open construction of the base 12 enables storage of the aid 10 in a position compact with respect to other equipment.

The vertical column 14 is also of tubular steel stock and the lower end thereof is slidingly received within the socket member 48, and is normally retained affixed thereto by means of a bolt 52 threadingly extending through the socket member 48 and through aligned openings, not shown, in the vertical column 14.

The bracket 16 comprises a vertical section 60 of square tubular steel stock slidable upon the square column 14 in a nonrotatable fashion. Means is provided for affording convenient manual adjustment of the vertical height of the bracket 16 and for releasably securing the same in adjusted position on the column 14. Such means comprises a handle 62 provided with a reduced threaded extension 64 at one end that threadingly extends the rear side of the tubular section 60 so as to bear against the column 14. In use, the handle 62 is grasped and then turned sufficiently to disengage the threaded extension 64 from the column 14 whereupon the bracket 16 can be moved vertically by use of the handle 62 to any desired height. On attaining such desired height the handle 62 is then turned to cause the threaded extension 64 to bear against the rear side of the column 14 so as to prevent inadvertent descent of the bracket 16, much in the manner of a set screw. A pair of horizontally disposed square tubular sections 70 and 72 are welded to the lateral sides of the tubular section 60 and extend in spaced parallelism rearwardly therefrom.

The tray 18 comprises a square welded open framework inclusive of sidewalls 76 and 78 and forward and rear end walls 80 and 82. A plate 84 coextensive with the open framework of the tray 18 is secured about its periphery to the undersides of the walls 76-82 to constitute the bottom of the tray 18. The walls 76-82 as well as the plate 84 are preferably steel. In order to prevent scarring or marring a surface against which the tray 18 may come into contact, the tray 18 is provided with a protective strip 86 of L-shape cross section about its lower forward and side edges, such strip 86 being preferably made of a suitable deformable synthetic resin. For a purpose subsequently to be explained, short vertical circular cylindrical socket members 90 are welded to the midpoints of each of the walls 76-82 as best shown in FIG. 7.

A pair of parallelly spaced tubular square members 94 and 96 are welded to the central portion of the tray wall 82 so as to extend rearwardly of the latter, such tubular members 94 and 96 constituting support arms for the tray 18 and being slidably receivable in the tubular section 70 and 72, respectively. The tubular sections 70 and 72 are provided with set screws threaded therein for releasable engagement with the tray support arms 92 and 96, such set screws being provided with finger grips 100 at their upper ends for the convenience of the user. The thumb screws 100 can be tightened to bear against the tray arms 94 and 96 when the latter are inserted therein so as to releasably retain the tray in its operative position supported by the bracket 16 in its adjusted position on the column 14.

When in its operative position as shown in FIG. 7, the rear ends of the tray arms 94 and 96 seat against plugs 106 that close the rear ends of the tubular sections 70 and 72 with the tray wall 82 being spaced from the bracket 16, with the extents of the arms 94 and 96 therebetween constituting means for supporting the combined bin and seat means 30 when the latter is serving its function as a parts bin. It will be noted also that when the tray 18 is in its operative position that it directly overlies the extent of the base 12 forwardly of column 14 so as to be very stable gravitationally. The base 12 having a horizontally disposed U-shape that opens forwardly cooperates with the vertical and forwardly opening U-shape defined by the base 12, the column 14 and the tray 18 to enable positioning the tray 18 very close and convenient to the work. For example, the tray 18 can be positioned over the radiator, engine or front fender of an automobile, and if need be, the base 12 can straddle a wheel of such automobile. Similarly, the tray 18 can overlie a workbench with the base straddling a leg of the latter.

The means 30 comprises a rectangular seat 110, which can be of wood or of a suitable synthetic resin reinforced by fibers of glass embedded therein. A pair of open-topped rectangular bins or receptacles 120 and 122 (which can be metal or a suitable reinforced synthetic resin) are fixedly secured by any suitable means, not shown, in spaced relation to the top of the seat 110 at the opposite ends of the latter. The spacing of the bins are such that they can be seated against the bottom tray wall 84 when they are inverted as shown in FIG. 1 with the seat 110 uppermost.

A generally U-shaped steel spring clip 128 is positioned on the top of the seat 110 between the bins 120 and 122 and has its web portion 130 fixedly secured by any suitable means to the seat 110 (see FIGS. 13 and 14). When the means 30 is detachably secured to the tray arms 94 and 96, the clip web 130 is seated against the lower sides of the tray arms 94 and 96 (see FIG. 14), with a bent end of the clip being engaged over the top of the arm 96. The other side 136 extends upwardly against the outer face of the arm 94 and is provided with teeth 138 that are engaged over the top of the arm 94. The side 136 of the clip extends or projects upwardly above the top of the arm 94 and constitutes a finger grip or tab by means of which the clip can be flexed to initiate disengagement of the clip from the arms 94 and 96 be resiliently flexing the teeth outwardly from engagement of the top of the arm 94.

Referring to FIG. 7, it will be seen that when the clip 128 is engaged with the arms 94 and 96 as described above, the bins or receptacles 120 and 122 are disposed on the opposite sides of the arms 94 and 96 with their tops uppermost for containing parts and the like, not shown.

Figure 2:
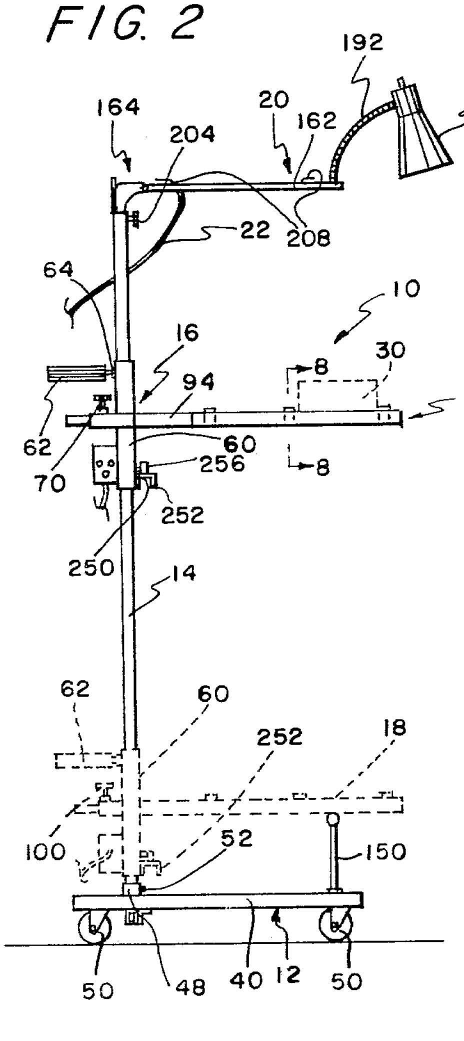
FIG. 2 is a side elevational view of the apparatus of FIG. 1 with the tray being shown at an intermediate height position in full lines, and shown in dashed outline at the position thereof in FIG. 1. Shown in dashed outline and disposed on the solid line depiction of the tray is a device having alternative use as a parts bin and when inverted, a seat.
Figure 3:
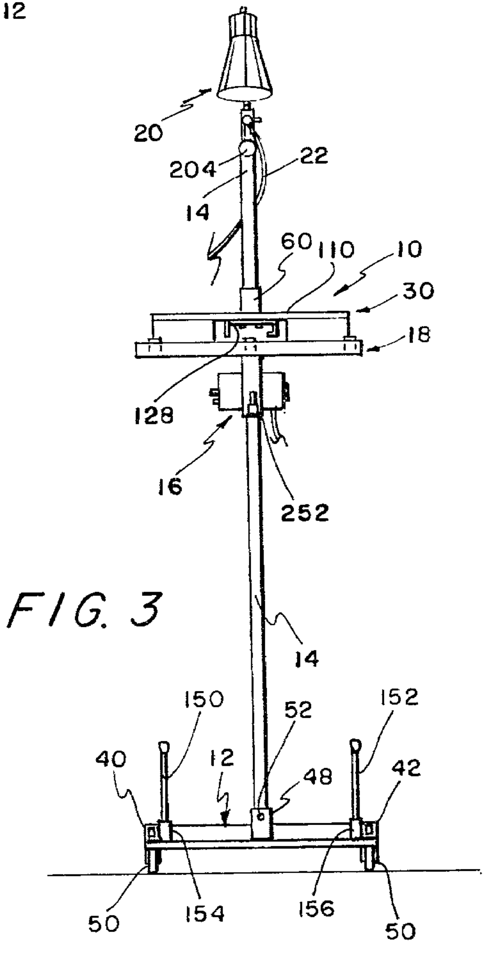
FIG. 3 is a front elevational view of the apparatus shown in FIG. 2.

The means 30 can be on removal from the arms 94 and 96 placed in inverted position on the tray bottom 84 adjacent the front tray wall 80 as shown in FIG. 1 or adjacent any of the other walls as, for example, wall 82, not shown. When so inverted, the means 30 can be employed as a seat as shown in FIG. 1. In order to afford additional support for the tray 18 when the means 30 is used as a seat, a pair of posts or struts 150 and 152 are vertically disposed and have their lower ends received in tubular sockets 154 and 156 welded to the base rails 40 and 42. The lower ends of the sockets 154 and 156 are constricted to prevent the props 150 and 152 from passing therethrough. With the props positioned, the bracket 16 is operated to lower the tray 18 to a position resting upon the props as shown in dashed outline in FIG. 2, and the handle 62 is then operated to secure the bracket 16 in its position.

When not in use, the props 154 and 156 are stored in the tray arms 94 and 96.

The lamp structure 20 comprises an articulated support in the form of two straight tubular members 160 and 162 that are pivotally connected by means 164 now to be described. The means 164 comprises a U-shaped member 166 that includes a web portion 168 that extends vertically and which has riveted thereto at 170 tubular section 160 and a steel leaf spring 172. As clearly shown in FIG. 6, the tubular section 160 is vertical, is disposed within the U-shaped member 166, and extends below the latter with the spring leaf 172 being disposed externally of the U-shaped member 166 and extending above the latter.

The flanges 174 and 176 of the U-shaped member 166 are of a generally triangular configuration and are shaped so that the upper extents thereof have a greater height than does the upper end of the web 168 as plainly shown in FIGS. 4 and 6. The tubular section 162 has one end disposed between the flanges 174 and 176 and is pivoted thereto by means of a rivet 180. When the lamp structure 20 is in use, the tubular section 162 is in the horizontal position shown thereof in full lines in the drawings, and is releasably retained in such position by means of a tang or tooth 182 fixedly extending through the spring leaf 172 so as to project into the interior of the tubing section 162 as shown in FIG. 6 when the spring leaf 172 is in its normal position biased toward the web member 166. The tubular section 162 can be released from its operative position by flexing the spring leaf 172 to the position shown in dashed lines thereof at 184 so as to disengage the tooth 182, whereupon the tubular section 162 can be swung through the dashed line position shown thereof to a vertical position suitable for storage. When it is desired to return the tubular section 162 to its operative position, the same is swung to such position with the same coacting with the tapered tooth 182 to cam by the latter so as to effect automatic reengagement or latching with the tooth 182.

Though the lamp means 20 can be selectively disposed in other locations as will be explained presently, the tubular section 160 can be slidingly inserted into the open upper end of the square column 14 with the lower end of the U-shaped member 166 resting upon the upper end of the column 14. The circular transverse configuration enables rotation of the lamp structure about the vertical axis of the tubular section 160.

A gooseneck type lamp means 190 is mounted upon the end of the tubular section 162 as shown in FIG. 1 with the hollow flexible metallic neck 192 having a lamp hood 194 at one end and having its other end extending vertically upward from the horizontal tubular section 162 adjacent the free end of the latter. An incandescent light bulb 196 of 12-volt rating is provided and is provided with leads 22 operatively connected thereto, and such leads are provided with alligator clips 198 at their ends remote from the bulb 196. The lamp housing 194 includes, as is conventional, a lamp socket and it will be understood that the bulb 196 is disposed in such socket. The leads 22 extend from the bulb 196 in its socket through the hollow interiors of the flexible gooseneck 192 and the tubular section 162 and emerge from the latter through a suitable opening, not shown, adjacent the means 164. The arrangement is such that the alligator clips 198 can be applied to the terminals of the automotive storage battery 24 so as to energize the 12-volt light bulb 196 as shown in FIG. 1. The flexibility or deformable character of the conventional gooseneck 192 coupled with the rotatability of the tubular section 162 in the column 14 affords a large degree of control over the region to which light emerging from within the hood 194 is directed. A knobbed set screw 204 threaded in the column 14 adjacent the upper end of the latter is releasably engageable with the tubular section 160 to retain the latter in a selected position. The flexibility in the positioning of the hood 184 is still further enhanced by the fact that the vertical tubular section 164 can be selectively positioned at any selected one of the previously described socket members 90 as well as in another socket that will be presently described. It will be observed that when the lamp structure 20 is used with any of the tubular sockets 90, vertical adjustments made with respect to the tray 18 are correspondingly effected with respect to the lamp structure 20. It should be understood that the circular tubular section 160 is rotatable about its axis when inserted in any one of the sockets 90.

U-shaped winding brackets 208 are fixed at spaced positions on the tubular section 162 about which the leads 22 can be wound for conventional storage when not in use, much in the same manner as excess cord is wound for storage on conventional vacuum cleaners as will be understood.

As suggested earlier, the 12-volt light 196 cannot only be energized from an automotive storage battery 24 as described above, the same can be energized from alternating current power mains wherever a convenience outlet is nearby. Means whereby such is accomplished will now be described, such means including the housing 28 fixed to the rear side of the bracket 16 containing an alternating current power transformer previously alluded to. The transformer 26 includes a primary winding (see FIG. 11) 212 which is electrically connected to a flexible power cord 214 that extends downwardly and outwardly from the housing 28 through a suitable opening, not shown, with the free end of the electrical power cord 214 being provided with a plug 216 suitable for use with conventional electrical convenience power outlets, also not shown. An electric fuse 218 is provided in the connection of the transformer winding 212 to the power cord 214 as a safeguard against inadvertent power overloads, and such fuse 218 is disposed or housed in a conventional fuse holder 220 mounted on the housing 28 for convenient inspection or replacement when necessary.

As a mechanic often has need of electric hand tools (drills, nut drivers, etc.), the housing 28 is preferably additionally provided with an outlet fitting or jack 224, and the latter is placed in electrical parallel with the transformer winding 212 by leads 226 and 228 for concurrent energization. In the preferred construction, the fuse 218 is unaffected by loads placed on the circuit through the jack 224, and it is assumed that appliances coupled with the jack 224 will include their own protective features (fuses, or the like).

The transformer 26 includes a secondary winding 230 that is connected by leads 232 and 234 to a pair of electrically isolated terminal posts 236 projecting outwardly from the housing 28. The transformer 26 is a step-down transformer such that the voltage applied to the primary coil 212 by the power cord 214 is transformed to produce an output of 12 volts across the output terminal posts 236, whereby the 12-volt light bulb 196 can be energized by applying the alligator clips 198 to the terminal posts 236. Typically the transformer will transform an a.c. votlage of about 115 V.A.C. to about 12 V.A.C.

For shipping purposes and compact packaging, the aid 10 can be largely disassembled, that is, the column 14 disconnected from the base 12, the tray 18 disconnected from the bracket 16, etc., as will be evident. When temporarily out of use, the aid 10 can be placed in the collapsed condition shown thereof in FIG. 12, that is, with the tray 18 disposed vertically in an edge-up storage condition with its wall 80 resting upon the base rails 40 and 42 and with the means 30 attached thereto in the manner shown in FIG. 7. Means is provided for releasably retaining the tray 18 and the means 30 in the condition shown in FIG. 12, such means comprising a clamp element 250 welded to the forward side of the lower end of the bracket 16. The clamp 250 has a downturned extremity 252 that is engaged over the seat 110 on lowering the bracket 16. Preferably, a socket 256 is welded atop the clamp 250 to afford an additional place to position the lamp structure 20, it being understood that the socket 256 is similar to the sockets 90.

The socket 256 can be used to support the lamp structure 20 if desired rather than the column 14 as shown in FIG. 1 in which event the lamp hood 194 can be much lower and close to one side of the mechanic 260 as will be readily understood.

When the aid 10 is placed in the collapsed condition shown in FIG. 12, the lamp structure 20 is preferably positioned atop the column 14, and the lamp hood then lowered by releasing the tubular arm 162 and pivoting the same clockwise to a vertical position through the position shown thereof in dashed outline in FIG. 6. Alternatively, the structure 20 positioned on the socket 256 with the arm 162 is moved to its depending vertical position as will be readily comprehended by those conversant with the art.

The aid 10 can be placed in its collapsed condition and restored in its operative condition conveniently and in a very short time interval. When collapsed, the aid 10 can be wheeled to an out-of-the-way position against a wall, or against a roof support column in which event the latter can be straddled by the base 12.

Having fully described the illustrated preferred embodiment of the invention as well as the use thereof, attention is now directed to the appended claims so that the actual scope of the invention may be ascertained.

I claim:

1. An automobile mechanic's aid comprising a wheeled base and an upstanding support column fixed thereto, said base having at least three wheels defining at least three non-colinear points of support whereby the base is adapted to rest stably in an upright condition upon a horizontal supporting surface, a mounting bracket slidably mounted on the column for selective vertical positioning therealong, means for releasably retaining the bracket on the column at a selected vertical position, a tray carried by the mounting bracket for vertical movement therewith, an electric lamp means carried by the bracket for vertical movement therewith, and energization means for enabling selective electrical energization of the lamp from alternating current power mains and an electric battery, said energization means also being carried by the bracket for vertical movement therewith, whereby a mechanic can vertically position the bracket to place needed tools and lamp in convenient and illuminating positions relative to a portion of an automobile requiring his attention, with the lamp being energizable from such automobile if necessitated by remoteness from power mains.

2. The combination of claim 1, wherein said means for selective energization comprising a pair of elongated and flexible electric leads operatively connected to the lamp with each lead having a spring clip electrical connector at an end remote from the lamp, said energization means also including a transformer having primary and secondary windings, an elongated electric power cord operatively connected at one end to the primary winding and having a plug at its other end for selectively engaging an electrical convenience outlet, said secondary winding terminating in a pair of transformer terminals, whereby a mechanic can selectively attach the clips to the transformer terminals and to terminals of an automobile storage battery.

3. The combination of claim 2, wherein a lamp support means is provided that includes an elongated arm having the lamp mounted upon an end portion thereof, said tray being provided with a plurality of socket members having upwardly directed openings therein, said arm having another end portion that is vertically disposed and selectively receivable in the openings of each of said socket members, the arrangement being such that the spatial orientation of the arm and the column can be varied by selective insertion of said another end portion of the arm in the socket members.

4. The combination of claim 2, wherein a lamp support means is provided that includes an elongated arm having the lamp mounted upon an end portion thereof, said tray being provided with a plurality of socket members having upwardly directed openings therein, said arm having another end portion that is vertically disposed and selectively receivable in the openings of each of said socket members, the arrangement being such that the spatial orientation of the arm and the column can be varied by selective insertion of said another end portion of the arm in the socket members, said column having a hollow upper end within which said another end of the arm is selectively receivable.

5. The combination of claim 3, wherein said arm includes first and second pivotally connected sections respectively including said end and said another end of the arm, said first section being swingable about its pivotal connection to the second section from a vertical storage position that is horizontally spaced from the second section to a horizontal operative position, and means for releasably retaining the first section in its operative position.

6. The combination of claim 5, wherein the lamp is provided with a hood and wherein the lamp and its hood are mounted on the first arm section by a selectively deformable tube, said first section of the arm being hollow, with a portion of said leads being disposed in said tube and in said first section of the arm.

7. The combination of claim 5, wherein said another end of the arm is rotatable about its vertical axis within the socket members and the upper end of the column.

8. The combination of claim 1, wherein the tray has a support arm fixed thereto, with the bracket having a tubular member fixed thereto that slidably and removably receives the support arm of the tray, whereby the tray is detachable from the bracket.

9. The combination of claim 1 together with means carried by the tray selectively constituting a seat and storage bins, said last means comprising a horizontal and generally rectangular plate and a pair of open-topped receptacles secured to the top of the plate, the arrangement being such that the plate can rest on the tray with the receptacles being serviceable as the storage bins, and such that the plate and the receptacles can be inverted upon the tray so that the plate can serve as a seat while being supported by the receptacles.

10. The combination of claim 9 including a pair of props detachably mounted on the base in the vertical travel path of the tray, whereby the tray can be supported by both the column and the props.

11. The combination of claim 10, including means for storing the props, said means including said tray support arm being hollow for reception of one of the props therein.

12. The combination of claim 9, wherein the receptacles are spaced from each other, and means attached to the plate intermediate the receptacles for detachably securing the plate and the receptacles to the tray support arm at a position intermediate the bracket and the tray.

13. The combination of claim 1, wherein said base is U-shaped with respect to the horizontal and includes a pair of spaced side portions connected by a transverse portion, said column being mounted centrally upon the transverse portion, with said tray being disposed directly above the space between the side portions of the base.

14. The combination of claim 8, wherein the tray is selectively positionable, when the same is detached from the bracket, in an edge-up storage condition between the base and the bracket and adjacent the column, and means carried by the barcket for releasably retaining the tray in its storage condition.

* * * * *